(12) United States Patent
Davies et al.

(10) Patent No.: US 8,798,418 B2
(45) Date of Patent: Aug. 5, 2014

(54) OPTICAL CABLE WITH IMPROVED STRIPPABILITY

(75) Inventors: Martin Davies, Milan (IT); Simon James Frampton, Milan (IT); Roger Pike, Milan (IT); Ralph Sutehall, Milan (IT)

(73) Assignee: Prysmian S.p.A., Milan (IT)

( * ) Notice: Subject to any disclaimer, the term of this patent is extended or adjusted under 35 U.S.C. 154(b) by 299 days.

(21) Appl. No.: 13/203,999

(22) PCT Filed: Mar. 16, 2009

(86) PCT No.: PCT/EP2009/053059
§ 371 (c)(1),
(2), (4) Date: Feb. 7, 2012

(87) PCT Pub. No.: WO2010/105657
PCT Pub. Date: Sep. 23, 2010

(65) Prior Publication Data
US 2012/0134635 A1    May 31, 2012

(51) Int. Cl.
*G02B 6/44* (2006.01)

(52) U.S. Cl.
USPC ........... 385/113; 385/100; 385/103; 385/104; 385/105; 385/106; 385/107; 385/108; 385/109; 385/110; 385/111; 385/112

(58) Field of Classification Search
USPC ......... 385/100, 103, 104, 105, 106, 107, 108, 385/109, 111, 113
See application file for complete search history.

(56) References Cited

U.S. PATENT DOCUMENTS

| 4,456,331 | A | 6/1984 | Whitehead et al. | |
|---|---|---|---|---|
| 5,050,957 | A | 9/1991 | Hamilton et al. | |
| 5,067,830 | A | 11/1991 | McAlpine et al. | |
| 5,113,036 | A * | 5/1992 | Arroyo et al. | 385/100 |
| 5,651,081 | A * | 7/1997 | Blew et al. | 385/101 |
| 6,236,790 | B1 | 5/2001 | Okada et al. | |
| 6,707,973 | B2 * | 3/2004 | Witt et al. | 385/109 |
| 6,714,707 | B2 * | 3/2004 | Rossi et al. | 385/109 |
| 7,099,542 | B2 * | 8/2006 | Ledbetter et al. | 385/109 |
| 7,197,215 | B2 * | 3/2007 | Baird et al. | 385/113 |
| 7,346,244 | B2 * | 3/2008 | Gowan et al. | 385/113 |

(Continued)

FOREIGN PATENT DOCUMENTS

| EP | 0 945 746 A2 | 9/1999 |
|---|---|---|
| FR | 2 555 764 | 5/1985 |
| FR | 2 633 402 | 12/1989 |
| WO | WO 2005/096053 A1 | 10/2005 |

OTHER PUBLICATIONS

International Search Report from the European Patent Office for International Application No. PCT/EP2009/053059 (Mail date Dec. 15, 2009).

*Primary Examiner* — Ryan Lepisto
*Assistant Examiner* — Guy Anderson
(74) *Attorney, Agent, or Firm* — Finnegan, Henderson, Farabow, Garrett & Dunner, L.L.P.

(57) ABSTRACT

An optical cable includes a buffer tube housing at least one optical fiber, a sheath surrounding such buffer tube and at least one longitudinal strength member embedded in the sheath, in which at least one separation element is provided between a portion of the outer surface of the buffer tube and the inner surface of the sheath, laying in an axial plane not containing the at least one strength member.

12 Claims, 2 Drawing Sheets

(56) References Cited

U.S. PATENT DOCUMENTS

| | | | |
|---|---|---|---|
| 7,391,943 B2 * | 6/2008 | Blazer et al. | 385/100 |
| 7,751,666 B2 * | 7/2010 | Parsons et al. | 385/100 |
| 7,817,891 B2 * | 10/2010 | Lavenne et al. | 385/109 |
| 8,363,994 B2 * | 1/2013 | Kachmar | 385/111 |
| 2002/0126968 A1 | 9/2002 | Witt | |
| 2006/0171645 A1 | 8/2006 | Kodaka et al. | |
| 2008/0080820 A1 * | 4/2008 | Andrews et al. | 385/101 |
| 2011/0002588 A1 * | 1/2011 | Osato et al. | 385/113 |
| 2011/0008007 A1 * | 1/2011 | Osato et al. | 385/113 |
| 2011/0217010 A1 * | 9/2011 | Kachmar | 385/111 |
| 2012/0134635 A1 * | 5/2012 | Davies et al. | 385/113 |

* cited by examiner

OPTICAL CABLE WITH IMPROVED STRIPPABILITY

CROSS REFERENCE TO RELATED APPLICATION

This application is a national phase application based on PCT/EP2009/053059, filed Mar. 16, 2009, the content of which is incorporated herein by reference.

BACKGROUND OF THE INVENTION

1. Field of the Invention

The present invention relates to optical cables, and more specifically to optical cables comprising a buffer tube, housing the optical fibers, and a sheath around such buffer tube.

A buffer tube loosely housing optical fibers is usually called "loose tube".

2. Description of the Related Art

These cables are required to have a certain tensile strength both to withstand the stress during cable laying operations and to bear loads applied to the cable itself, for example in case of aerial installation.

To this purpose the cable construction includes one or more strength members. Preferably diametrically opposed strength members are used.

Typically, especially when a limited number of fibers are contemplated for the cable, a central tube construction is used, in which the buffer tube is axially arranged and a sheath coaxially surrounds the buffer tube. Otherwise, a multi tube construction can be used inside the sheath.

In order to maximize the tensile performance of the cable it is important that all the cable constituents work as one and that there is no relative slippage between buffer tube, strength members and cable sheath.

The congruency of the various elements is obtained by embedding the strength members in the cable sheath and selecting the sheath material and the strength members material so that an adequate adhesion is obtained between them.

The thickness of the sheath should be such to cushion the cable elements housed therein, but in some cases other tasks should be considered. For example, when the cable is used in suspension installation, the strength members thereof may be advantageously made in metal to withstand the challenging environmental conditions of this application; however the coexistence of live aerial electric conductors can cause electric voltage arcing across the metallic strength members, thus it is important to provide the cable with a sheath thick enough to hinder this electric flow.

U.S. Pat. No. 5,050,957 relates to an optical fiber cable including a core comprising at least one optical fiber which is enclosed in a relatively rigid tubular member comprised of a plastic material. Disposed about the tubular member is a jacket which is comprised of a plastic material which is substantially less rigid than that of the tubular member. The plastic material of the jacket is characterized by a cut-through resistance which is substantially less than that of the plastic material of the tubular member. Disposed within the jacket and in engagement with the tubular member are two diametrically opposed strength member groups. Each of the strength members is in proximate engagement with the tubular member.

The engagement of the strength members with the tubular member (as well as with the sheath), while providing enhanced strength to the cable, causes the separation of the sheath from the tubular member to become relatively difficult.

The cable sheath should be easily removable. For example, when the cable reaches a customer premise, the buffer tube containing the fiber must be exposed and the optical fibers accessed to be connected to a user's apparatus or to corresponding fibers of other cables.

U.S. Pat. No. 4,456,331 illustrates a communications cable comprising a core, a plurality of channels each of which is dimensioned to contain a layer of optical fibres running along the outer peripheral surface of the core and an external sheath covering the core, the sheath being openable at locations positioned over at least some and preferably all of the channels whereby external access to the fibres in the channel can be obtained. Preferably a removable strip of sheath defined by zones of weakness extends over each channel.

In this cable the fibres are housed in channels made in the sheath itself and are not protected by an independent tubular housing.

U.S. Pat. No. 5,067,830 addresses the problems of cable access in mid-span and describes a tube holding an optical waveguide, the tube having a first lengthwise indentation in its outer surface and a second lengthwise indentation in its inner surface adjacent to the first lengthwise indentation. The cable tube may also have a third lengthwise indentation in its outer surface located 180° from the first lengthwise indentation, and a fourth lengthwise indentation in its inner surface located 180° from the second lengthwise indentation. With this arrangement, a tube slitting tool may be used with less danger to optical waveguides within the tube.

In this cable the fibres are arranged in ribbons rigidly housed in a tube.

A common way for removing the cable sheath from around the buffer tube provides the step of making two longitudinal cuts along the cable sheath. The cuts must be provided between the strength members to ensure the cutter blade to go through to the outside of the buffer tube. For helping the identification of the cut position, grooves can be provided on cable sheath surface, as shown for example in FR 2633402.

However, it is difficult to pull the cutter along the cable, both for the pulling force required cutting the whole thickness of the sheath and because the cut depth has to be carefully controlled to slice the sheath substantially completely, but without damaging the underlying buffer tube.

SUMMARY OF THE INVENTION

In view of this problem it has been found that by providing a non-bonding separation element embedded in the inner portion of the sheath at the interface with the outer surface of the buffer tube, the sheath thickness to be cut can be reduced, the cutting blade is kept apart from the buffer tube, and the detachment of the cable sheath from the buffer tube is eased.

By "non-bonding separation element" it is meant an element which either does not stick or adhere to the outer surface of the buffer tube and the inner surface of the sheath, or which has an inherent resistance low enough to prevent bonding of the buffer tube to the sheath.

Examples of elements with low inherent resistance include fibrous elements, such as aramid (aromatic polyamide) or glass yarns (which have very high resistance in the longitudinal direction but no transversal resistance, as the filaments forming the yarns are not bonded to each other).

In case solid elements with significant transversal strength are used, non-sticking materials, or the use of anti-sticking coatings is contemplated.

According to a first aspect of the present invention, it has been found an optical cable comprising a buffer tube housing at least one optical fiber, a sheath surrounding such buffer tube and at least one longitudinal strength member embedded in the sheath, in which at least one separation element is provided between a portion of the outer surface of the buffer tube and the inner surface of the sheath, laying in an axial plane not containing the at least one strength member.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferably, the buffer tube and the sheath are axially arranged.

Preferably the cable comprises two diametrically opposed strength members arranged in an axial plane.

In a preferred embodiment, the axial plane of the at least one separation element forms an angle of substantially 90° with the axial plane of the strength members.

More preferably, the cable includes two diametrically opposed separation elements.

In a preferred embodiment, the at least one separation element extends around the circumference of the buffer tube for an extension angle of from 30° to 120°.

In a preferred embodiment, the height of the at least one separation element in the radial direction is of from 20% to 80% of the sheath thickness.

Preferably, at least one longitudinal groove is provided in the outer surface of the sheath, such at least one longitudinal groove being located in an axial plane crossing the at least one separation element.

More preferably, the longitudinal groove is located by the same side of the separation element with respect to the buffer tube.

Preferably, the at least one separation element extends around the circumference of the buffer tube for an extension angle of from 30° to 120° and the axial plane of the at least one longitudinal groove is arranged at an angle with the axial plane of the at least one separation element which is smaller than ½ of the extension angle.

BRIEF DESCRIPTION OF THE DRAWINGS

Further details are provided in the following description of some exemplary embodiments of the invention, with reference to the attached figures.

DETAILED DESCRIPTION OF THE INVENTION

Figure 1:
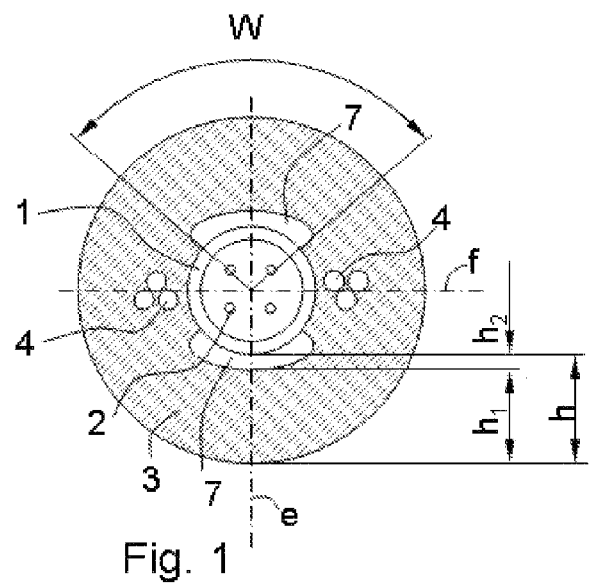
FIG. 1 shows a cable according to a first embodiment of the invention.

In the embodiment of FIG. 1 the cross-section of an optical cable is shown, which comprises a buffer tube 1, containing a number of optical fibers 2, surrounded by a sheath 3.

Typically, the optical fibers 2 are loosely housed within the buffer tube 1, so that substantially no mechanical coupling is between fibers and buffer tube, thereby preventing a load applied to the buffer tube from being transmitted to the fibers.

Preferably, the buffer tube 1 is made of a thermoplastic polymer such as polybutylene terephthalate (PBT). The sheath 3 can be advantageously made of polyethylene, preferably high density polyethylene (HDPE).

Two diametrically opposed strength members 4 are embedded in the sheath 3.

In the embodiment of FIG. 1, each of strength members 4 can be made in the form of a strand of metallic wires (e.g. brass plated steel wires).

Figure 3:
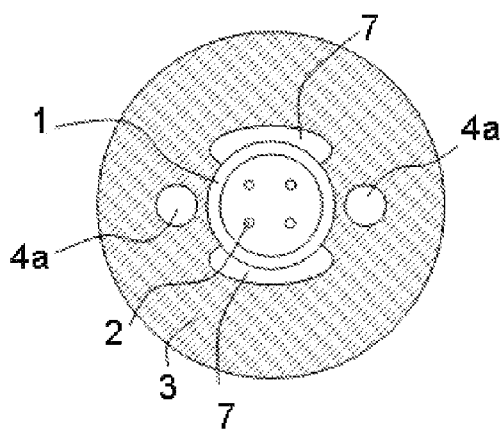
FIG. 3 shows a cable according to a third embodiment of the invention

Alternatively, if a dielectric cable is desired, the strength members 4 can be dielectric, such as rods of glass or aramid fibers reinforced resin, as shown in FIG. 3 with reference 4a.

The cable shown in FIG. 1 is a "central loose tube cable", intended for use as a drop cable, for example as final link connecting a main optical line of an optical network to a customer's premise.

This kind of cable can be installed either as an aerial or underground cable.

Typically, with a cable having outer sheath diameter of about 6 mm and a buffer tube of outer diameter of about 2.2 mm, a minimum sheath thickness of about 1.0 mm over the strength members is preferred, particularly in case metallic strength members are used, both for the mechanical resistance of the sheath and to ensure electric insulation when the cable is used as an aerial cable, in order to prevent electric voltage from arcing across to the metallic strength members when the cable comes into contact with live aerial electricity conductors.

In such case, it is important to ensure a sheath thickness between the metallic strength members and the closest contact point that the electricity conductor can get thick enough to prevent electrical arching.

In the example, the nominal cable sheath thickness, across the plane "f" of the metallic strength members 4 is about 1.9 mm.

Different sizes and thickness can be used in other embodiments, for example when higher or smaller number of fibers is required in the buffer tube, or in case higher or lower tensile loads are to be faced, etc. Additional protecting elements can also be used, in case further protection is required.

In any event, in order to maximize the tensile performance of the cable it is important that all the cable components (except the fibers, when the cable is made with the so-called "loose design") work as one and that there is no relative slippage between the central buffer tube, the strength members and the cable sheath.

When the cable reaches the user's premise, the sheath and the strength members are no more required and the buffer tube is sufficient for providing the required protection to the optical fibers for the last length of connection.

Accordingly, the cable sheath and the strength members embedded therein must be removed.

In order to remove the cable sheath from around the buffer tube, two longitudinal cuts are typically made along the cable sheath, in an area between the strength members in order to ensure that the cuts go through to the outside of the central loose tube.

Figure 4:
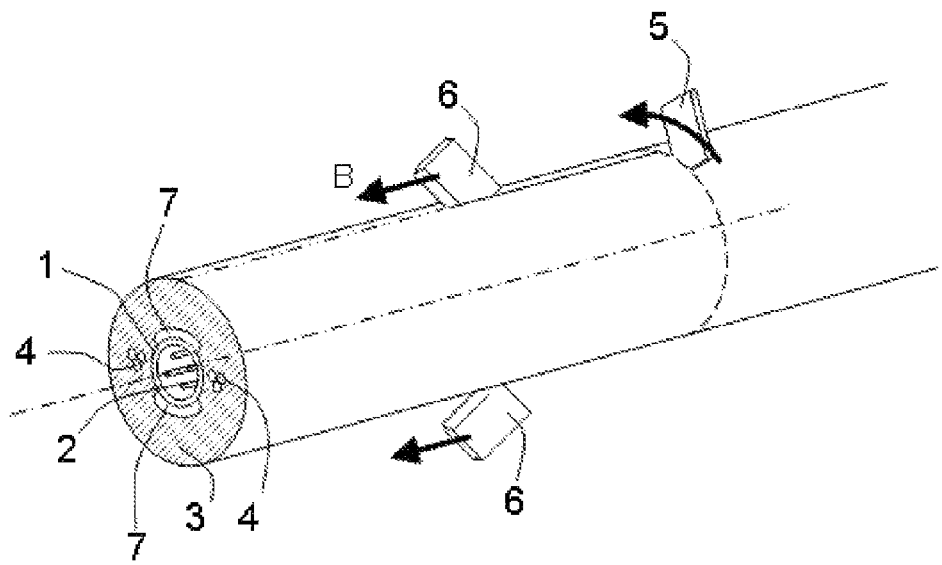
FIG. 4 schematically shows a step in the cable sheath removal process
Figure 5:
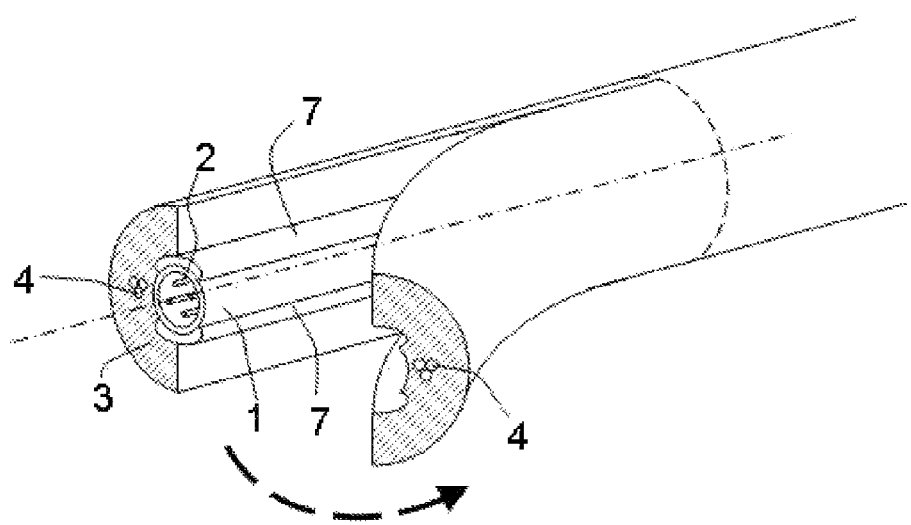
FIG. 5 schematically shows a further step in the cable sheath removal process

The cutting process is schematically shown in FIGS. 4, 5.

At the required distance from the cable end, after a convenient mark has been made on the cable sheath, the cable is circumferentially cut down to the strength members 4, with a blade 5, or a suitable circumferential cutter.

Subsequently, a cutting tool, preferably a suitably designed stripper 6 (not shown in detail and schematically exemplified in the drawing by a couple of diametrically opposite cutter blades) is slipped onto the cable sheath 3 ensuring that the blades or stripper cutters 6 are at 90° to the wire strength members, up to the circumferential cut, then the blades or the stripper 6 are pulled along the cable sheath 3 towards the cable end, obtaining two longitudinal cuts along the sheath 3 for its whole thickness.

Finally, as shown in FIG. 5, the two halves of the cable sheath 3 are separated until the circumferential cut, exposing the buffer tube 1 containing the optical fibres 2. Thereafter the two halves of the cable sheath 3, together with the steel wires of the strength members 4 are carefully cut away, leaving the buffer tube 1 ready for assembly into a joint or termination point.

As the longitudinal cut operation may either cause a damage to the buffer tube 1 or be difficult because of the depth of the sheath 3 to be cut, in order to facilitate the operation a non-bonding separation element 7 (or, preferably, a couple of diametrically opposed non-bonding separation elements 7) is provided between the buffer tube 1 and the sheath 3, laying in an axial plane "e" (see FIG. 1)

These separation elements 7 reduce the radial thickness of the cable sheath 3 in correspondence with the longitudinal cut line B and thereby reduce the resistance to the stripper blades 6.

In addition, a possible error in the cut depth does not cause the blades 6 to contact and damage the buffer tube 1, but only a portion of the thickness of the separation elements 7.

Preferably, the height $h_2$ of the separation elements 7 (in the radial direction) from the outer surface of the buffer tube 1 is of from 20 to 80% of the sheath thickness, such as to leave a solid portion $h_1$ of sheath 3 (see FIG. 1) of about 80 to 20% of the sheath thickness h, depending on the cable size and intended use, in order to both maintain a sufficient strength of the sheath and facilitate the longitudinal cutting operation.

The width of the separation elements 7 is preferably such that allows a sufficient tolerance in the angular alignment of the plane "e" of the longitudinal cutting blades. Such plane should theoretically be at 90° with the plane containing the axes of the strength members 4, but in case of manual operation a certain amount of angular displacement can be accepted.

In practice, the width of the separation elements 7 is preferably such to correspond to an angle W of from 30 to 120°, (symmetrically arranged with respect to the plane "e") in order not to excessively reduce the contact surface between the buffer tube 1 and the sheath 3 and not to interfere with the strength members 4.

Preferably, the separation elements 7 have a rounded contour.

The separation elements 7 are "non-bonding", being made of a material which does not stick or adhere to the cable sheath, so that the sheath can be easily detached from the separation elements 7.

If required, a non-sticking agent can be applied over the surface of the separation elements 7.

Alternatively, non-bonding separation elements 7 can be made of a material having a low tear resistance such not to cause resistance when the cut sheath is removed from the buffer tube 1, thereby causing no bonding between the sheath 3 and the buffer tube 1.

Preferably, separation elements 7 are made of non-metallic material, such as aramid (aromatic polyamide) or glass yarns (preferably not impregnated with a polymerized resin).

Preferably, the material of separation elements 7 has a higher melting point than that of the cable sheath material, so that it is not damaged or altered during the extrusion process of the sheath 3 nor is subject to a bonding to the sheath because of its partial melting or softening during extrusion.

In case the separation elements 7 are made of a material having a significant tensile strength, they may contribute to the increase in the tensile force that the cable can be subjected to (or allow a corresponding reduction in the size of the strength members).

The advantages of the solution include:
The reduction in radial thickness of the sheath at the cutting point ensures a decrease in the force required to pull the cable stripper along the cable;
If the reduction in radial thickness of the sheath was to be made on the outside of the cable resulting in an oval cable then:
  the cable would be subject to an increased chance of 'galloping' (low frequency, high amplitude) when subjected to a crosswind,
  it would be difficult to design a tension clamp with which to fix the cable to the pole,
  the electrical performance of the cable would be reduced;
The introduction of non-bonding material such as aramid/glass yarns into the cable can result in an increase in the tensile strength of the cable;
The use of a non-bonding material such as aramid/glass yarns ensures that the cable sheath does not stick thereto and ease the removal of the sheath;
Because some of the cable sheath is still in contact with the buffer tube there is no 'slip layer' between the two thus maintaining the tensile/optical performance of the cable.

Figure 2:
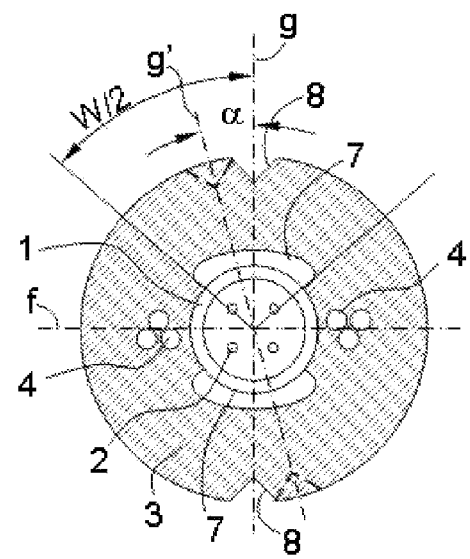
FIG. 2 shows a cable according to a second embodiment of the invention

As shown in the embodiment of FIG. 2, the identification of the proper plane for performing the longitudinal cut of the sheath 3 can be facilitated by a couple of longitudinal grooves 8, aligned in a plane "g" at 90° with the plane "f" containing the strength members 4, i.e. in the plane "e" (of FIG. 1) where the separation elements 7 are arranged.

In case the separation elements 7 and the grooves 8 cannot lay in the same plane (either for technical reasons or because of manufacturing tolerances), the groove containing plane "g'" can be arranged at an angle α with the plane "e" smaller than ½ of the angle "W" covered by the separation elements 7.

The grooves 8 can be made during the manufacture of the cable sheath 3. Preferably, the depth of the grooves may be approximately 0.5 mm. However, deeper or shallower grooves may be used, depending on the specific cable design and size.

The grooves 8 have the benefit of properly identifying the position where the longitudinal cuts have to be made in order to strip the cable sheath 3. Also, they contribute to reduce the radial thickness of the cable sheath 3, thus making easier to pull the longitudinal stripper 6 along the cable.

The manufacturing process involves laying the cable elements together and extruding the cable sheath around them.

Within the extruder cross-head, where the sheath material is formed around the cable elements, is an extrusion die. By designing the die to the shape of the cable longitudinal grooves will be formed into the cable sheath.

The invention claimed is:
1. An optical cable comprising a buffer tube housing at least one optical fiber, a sheath surrounding said buffer tube and at least one longitudinal strength member embedded in the sheath, wherein at least one separation element is provided between a portion of an outer surface of the buffer tube and an inner surface of the sheath, laying in an axial plane not containing the at least one strength member, wherein the at least one separation element extends around a circumference of the buffer tube for an extension angle of 30° to 120°.

2. The optical cable according to claim 1, wherein the buffer tube and the sheath are axially arranged.

3. The optical cable according to claim 1, comprising two diametrically opposed strength members arranged in an axial plane.

4. The optical cable according to claim 3, wherein the axial plane of the at least one separation element forms an angle of substantially 90° with the axial plane of the strength members.

5. The optical cable according to claim 4, comprising two diametrically opposed separation elements.

6. The optical cable according to claim 1, wherein the height of the at least one separation element in a radial direction is 20% to 80% of a sheath thickness.

7. The optical cable according to claim 1, comprising at least one longitudinal groove in an outer surface of the sheath, and at least one longitudinal groove located in an axial plane crossing the at least one separation element.

8. The optical cable according to claim 7, wherein the longitudinal groove is located on a same side of the separation element with respect to the buffer tube.

9. The optical cable according to claim 7, wherein the at least one separation element extends around a circumference of the buffer tube for an extension angle of 30° to 120° and in which the axial plane of the at least one longitudinal groove is arranged at an angle with the axial plane of the at least one separation element which is smaller than ½ of the extension angle.

10. An optical cable comprising a buffer tube housing at least one optical fiber, a sheath surrounding said buffer tube and at least one longitudinal strength member embedded in the sheath, at least one separation element between a portion of an outer surface of the buffer tube and an inner surface of the sheath laying in an axial plane not containing the at least one strength member, at least one longitudinal groove in an outer surface of the sheath, and at least one longitudinal groove in an axial plane crossing the at least one separation element.

11. The optical cable according to claim 10, wherein the longitudinal groove is located on a same side of the separation element with respect to the buffer tube.

12. The optical cable according to claim 10, wherein the at least one separation element extends around a circumference of the buffer tube for an extension angle of 30° to 120° and in which the axial plane of the at least one longitudinal groove is arranged at an angle with the axial plane of the at least one separation element which is smaller than ½ of the extension angle.

* * * * *